(12) United States Patent
Duffy

(10) Patent No.: US 6,926,781 B2
(45) Date of Patent: Aug. 9, 2005

(54) CONTINUOUS FILTER FRAMING STRIP STORABLE IN ROLL FORM

(75) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 234 days.

(21) Appl. No.: 10/099,548

(22) Filed: Mar. 14, 2002

(65) Prior Publication Data

US 2003/0172633 A1 Sep. 18, 2003

(51) Int. Cl.[7] .............................................. B01D 46/10
(52) U.S. Cl. .................. 156/60; 156/196; 156/201; 156/221; 156/250; 156/269; 156/324; 55/490; 55/495; 55/497; 55/500; 55/521; 55/DIG. 5
(58) Field of Search ..................... 55/486, 487, 490, 55/495, 497, 500, 502, 511, 521, DIG. 5, DIG. 31; 156/60, 73.5, 196, 199, 201, 202, 204, 221, 227, 250, 269, 324; 428/12, 543

(56) References Cited

U.S. PATENT DOCUMENTS

| | | | |
|---|---|---|---|
| 1,832,281 A | | 11/1931 | Davies |
| 2,032,262 A | | 2/1936 | Cori |
| 2,058,669 A | | 10/1936 | Dollinger |
| 3,296,781 A | | 1/1967 | Schumann |
| 3,513,643 A | | 5/1970 | Tarala |
| 4,386,948 A | | 6/1983 | Choksi et al. |
| 4,692,177 A | | 9/1987 | Wright et al. |
| 4,731,047 A | * | 3/1988 | Lobb ........................... 493/10 |
| 4,904,288 A | * | 2/1990 | d'Augereau ................. 55/487 |
| 4,963,171 A | | 10/1990 | Osendorf |
| 4,976,677 A | | 12/1990 | Siversson |
| 5,188,646 A | | 2/1993 | Nolen, Jr. |
| 5,429,580 A | * | 7/1995 | Diaz ............................. 55/511 |
| 5,501,794 A | | 3/1996 | Van de Graaf et al. |
| 5,599,446 A | | 2/1997 | Junker et al. |
| 5,603,747 A | | 2/1997 | Matuda et al. |
| 5,618,324 A | * | 4/1997 | Sommer et al. ............... 55/497 |
| 5,704,953 A | | 1/1998 | Stemmer |
| 5,779,747 A | | 7/1998 | Schlör et al. |
| 5,792,229 A | | 8/1998 | Sassa et al. |
| 5,814,219 A | | 9/1998 | Friedmann et al. |
| 5,840,094 A | | 11/1998 | Osendorf et al. |
| 5,919,122 A | | 7/1999 | Geiger et al. |
| 6,254,653 B1 | | 7/2001 | Choi et al. |
| 6,267,832 B1 | * | 7/2001 | Choi ........................... 156/269 |
| 6,406,509 B1 | | 6/2002 | Duffy |
| 6,485,544 B1 | * | 11/2002 | Ziske ........................... 55/502 |

FOREIGN PATENT DOCUMENTS

| | | | |
|---|---|---|---|
| DE | 197 46 804 A1 | 4/1998 | |
| DE | 265 098 | 3/2000 | |
| FR | 2 398 531 | 2/1979 | |
| GB | 2286136 | 8/1995 | |
| JP | 7-299317 | 11/1995 | |
| WO | WO 94/11089 | 5/1994 | |
| WO | WO 96/29138 | 9/1996 | |
| WO | WO 98/20961 | 5/1998 | |
| WO | WO 01/02080 A1 * | 1/2001 | ........... B01D/46/52 |
| WO | WO 01/05486 | 1/2001 | |
| WO | WO 01/05486 B1 * | 1/2001 | ........... B01D/46/52 |
| WO | WO 01/47619 | 7/2001 | |

* cited by examiner

Primary Examiner—Blaine Copenheaver
Assistant Examiner—Jason M. Greene
(74) Attorney, Agent, or Firm—William J. Bond

(57) ABSTRACT

A continuous strip of framing material suitable for use in making filter products that can be provided of indefinite length and which is storable as a flat product capable of being wound into roll form. Moreover, the continuous strip of framing material includes features to create a three-dimensional frame structure for wrapping about filtration media in a manner to provide a strong and effective filter product assembly.

24 Claims, 9 Drawing Sheets

CONTINUOUS FILTER FRAMING STRIP STORABLE IN ROLL FORM

TECHNICAL FIELD

The present invention is directed to framing material that is suitable for making a frame about filter media to create a framed filter product that may be shaped for a specific application. In particular, the present invention is directed to a framing material that can be provided as a continuous strip of indefinite length and that is suitable to be wound and stored in rolled form.

BACKGROUND OF THE INVENTION

Filter products typically include a quantity of filtration media and a frame that is not only sized and shaped to partially enclose and support the filtration media, but also sized and shaped so that the filter product can be inserted or supported in place based upon a particular application. Conventionally, filter frames have been constructed from multiple elements that are assembled together or connected to the filtration media, such as about its perimeter, so as to provide the support and application-specific filter frame. Such frame elements are known to be made from a variety of materials, including metals, plastics, and paperboard. In the case of a rectangular filter product, for example, a rectangular filtration media is surrounded at its four sides by frame pieces that may be connected at the corners and/or connected to the four side edges of the filtration media. The majority of the filtration media is thus capable of use for its filtering ability.

Moreover, these typical frame elements comprise three-dimensional elements that are sized and shaped to partially enclose the filtration media at its edges. The frame may comprise multiple pieces assembled by use of adhesive, welding, friction fit, snap fits, mechanical fasteners, or like. Otherwise, the entire frame or any selective portion thereof may be made integral. That is, a frame portion comprising multiple elements made together may be provided, such as, for example, by an injection molding process. In any case, the one or more frame elements must be assembled and connected with the filtration media by a selective assembly process. Such a selective assembly process requires manipulations of the elements for assembly. A selective assembly process, as used herein, is contrasted with an in-line process where elements are brought together in a continuous manner from materials of indefinite length and by which at least an intermediate product combining the continuous materials is created. By indefinite length, it is meant that a material may be provided in many different supply forms, such as, for example, in roll form, but in any case where the length of material supplied is not specifically related to the length that would be needed for a single product application.

Many types of filter products have also been developed for many different types of applications. Applications often are based in large part upon the characteristics of the filtrate and the carrier fluid and upon the support requirements of the system of the particular application. Filtering requirements may make it necessary to construct the filter products under construction specifications that ensure that all carrier fluid and filtrate must pass through the filter product. This may require appropriate sealing mechanisms between the frame and its system support, for example by one or more gaskets, and between the frame and the filtration media, for example by adhesive sealant. Such adhesive sealant may be provided as a bead extended along the entire frame at an interface between the frame and the filtration media. For example, a typical high-efficiency particulate air (HEPA) filter uses pleated filtration media sealed about its edges to a frame that is provided about its complete perimeter. Thus, the filtration media and frame provide a fluid tight assembly that prevents bypass of unfiltered carrier fluid.

A continuous strip of framing material that can be manufactured as an indefinite length and converted into a filter frame is disclosed in the PCT International Application publication number WO 01/02080A1, published Jan. 11, 2001. Specifically, a continuous strip framing blank can be made by extrusion, the framing blank having a sidewall portion and plural tabs that extend from the sidewall portion to create a u-channel of indefinite length. This channel is then notched at its tabs to form corners that may further be scored to permit easy bending of the channel at corners of the filtration media, which media may comprise a pleated filtration media or other flat media of a shape such as a rectangle. An important aspect of the continuous strip of framing blank material is that it may be made by co-extrusion techniques so that different portions of the framing blank material may have different characteristics. For example, the framing blank material may also include seal enhancement features of a much more flexible nature than the frame sidewall and tabs, which combination of features may be made by coextruding different polymeric materials together having appropriate characteristics. To assemble such filter, the continuous strip framing material is cut into discrete frame blanks with predetermined corners and the frame blanks are wrapped about filter media with an adhesive potting compound at an interface between the filter media and the frame channels.

However, in addition to improving the ability to make a continuous framing material, it is also desirable to more effectively store and supply the continuous framing material and assemble framing material to the filtration media by a continuous in-line process. In the case of the continuous strip of framing blank material of the above copending case, the channel structure of the framing material makes it difficult to create a supply form of the framing material capable of providing an indefinite length of material of a significantly greater length than that required for individual cases, such as would be obtainable if the material could be wound into a roll form.

SUMMARY OF THE PRESENT INVENTION

The present invention overcomes the shortcomings of the prior art by providing a continuous strip of framing material suitable for use in making filter products that can be provided of indefinite length and which is storable as a flat product capable of being wound into roll form. Moreover, the continuous strip of framing material includes features to create a three-dimensional frame structure about filtration media in a manner to provide a strong and effective filter product assembly.

In one aspect of the present invention, such advantages are achieved by a method of making filtration product comprising the steps of providing filtration media having a first face, a second face and at least one side edge surface; providing an indefinite length supply of strip framing material, said strip framing material including a longitudinally extending sidewall portion and an edge portion; combining a length of the strip framing material along at least a portion of the side edge surface of the filtration media; bending the edge portion of the strip framing material that has been combined with the filtration media from a first orientation, wherein the edge portion extends generally in a transverse direction of the sidewall portion of the strip framing material, to a second orientation, wherein the edge portion extends more toward the filtration media than in the first orientation thereof; securing the edge portion of the strip framing material in its second orientation; and cutting the strip framing material as combined with the filtration media from its supply of indefinite length.

The strip framing material may be combined with the filtration media while moving the filtration media in a machine direction. Preferably, the bending step is conducted while the filtration media and the combined strip framing material are moved together in the machine direction. Depending on the filtration media, it may be supplied from an indefinite length supply of the filtration media, in which case it can also be cut with the strip framing material. Preferably, the edge portion is reoriented to be positioned substantially perpendicular to the sidewall portion of the strip framing material.

According to a preferred method, the strip framing material is supplied as an indefinite length with a living hinge extending longitudinally of the strip framing material that divides the sidewall portion from the edge portion so that the edge portion can be reoriented along the living hinge. Such a living hinge can be created in any known or developed way. Two reorientable edge portions can be provided so that the bending step can also include bending both edge portions relative to the sidewall portion from first orientations toward the filtration media.

Also according to a preferred method, the step of providing an indefinite length of strip framing material comprises supplying the strip framing material having a layer of adhesive on at least a portion of a surface of the sidewall portion thereof, and the combining step further includes adhering the adhesive on the sidewall portion of the strip framing material along an edge of the filtration media. Preferably, the edge portions are secured in their second orientations by the adhesive.

Additionally, a second indefinite length supply of strip framing material may be operatively supported so that a length of the second indefinite length supply of strip framing material can also be combined along a portion of a second side edge surface of the filtration media, which edge portion thereof may also be bent after combination with the filtration media. Preferably, the strip framing material lengths are combined with the filtration media along oppositely facing side edge surfaces of the filtration media, and the combining, bending and cutting steps are performed at both side edge surfaces at substantially the same processing times. After the combining, bending and cutting steps are performed at both oppositely facing side edge surfaces, a third or more indefinite length supply of strip framing material can be provided and combined along at least a portion of a third side edge surface of the filtration media. Such additional strip framing material lengths can then be bent and secured in position as bent, and cut as needed.

According to another aspect of the present invention, a method of making filtration product may comprise the steps of providing filtration media having a fluid inlet face, a fluid outlet face and at least one side edge surface; providing a supply form of strip material and forming at least one fold line extending longitudinally of the strip material for making an indefinite length of strip framing material, the strip framing material longitudinally divided into at least a sidewall portion and an edge portion; combining a length of the strip framing material along at least a portion of the side edge surface of the filtration media; and bending the edge portion of the strip framing material that has been combined with the filtration media from a first orientation, wherein the edge portion extends generally in a transverse direction of the sidewall portion of the strip framing material, to a second orientation, wherein the edge portion extends more toward the filtration media than in the first orientation thereof.

Preferably, before combining the strip framing material with the filtration media, additional fold lines are formed that also extend longitudinally of the strip material and the strip material is converted into the strip framing material by folding the strip material along the fold lines to provide two edge portions and the sidewall portion with at least one of the edge and sidewall portions having multiple layers.

According to yet another aspect of the present invention, a strip framing material is provided for combination along an edge surface of filtration media in making a filtration product. The strip framing material comprises a longitudinally extending sidewall portion and a first edge portion divided from the sidewall portion by a longitudinally extending first living hinge, the first living hinge permitting the first edge portion to be folded from a first orientation, wherein the first edge portion extends generally in a transverse direction of the sidewall portion of the strip framing material, to a second orientation, wherein the first edge portion extends substantially perpendicular from the sidewall portion. Preferably, a second edge portion is also divided from the sidewall portion by a longitudinally extending second living hinge, the second living hinge permitting the second edge portion to be folded from a first orientation, wherein the second edge portion extends generally in a transverse direction of the sidewall portion of the strip framing material, to a second orientation, wherein the second edge portion extends substantially perpendicular from the sidewall portion. One or more seal elements may also be provided that extend from the strip framing material to create effective seals after a frame is made. Preferably, such seal elements are provided along the sidewall portions of the strip framing material so as to extend at an angle thereto. Also, such seal elements may be comprised of resilient material so that they can be folded against the sidewall portion to facilitate rolling of the strip material.

Such a strip framing material has a specific advantage of being able to be provided in the form of a supply roll, wherein the roll of strip framing material comprises multiple layers of the strip framing material having its sidewall portion and first and second edge portions configured so that each layer is substantially flat.

DETAILED DESCRIPTION OF THE PREFERRED EMBODIMENTS

With reference to the attached drawings, wherein like components are labeled with like numerals throughout the several figures, a system 10 is provided for combining strip framing material 12 with filtration media, such as a pleated filtration media 14, as a continuous in-line process. A continuous in-line process, as used herein, means a process where at least one material, preferably the strip framing material 12, is supplied from an indefinite length supply and brought into the process in a continuous manner over at least the making of a plurality of filter products or intermediate products thereof while the materials move in-line. An indefinite length of supply is simply used to mean having a length and that is not specifically related to the making of a single product or intermediate product.

Figure 1:
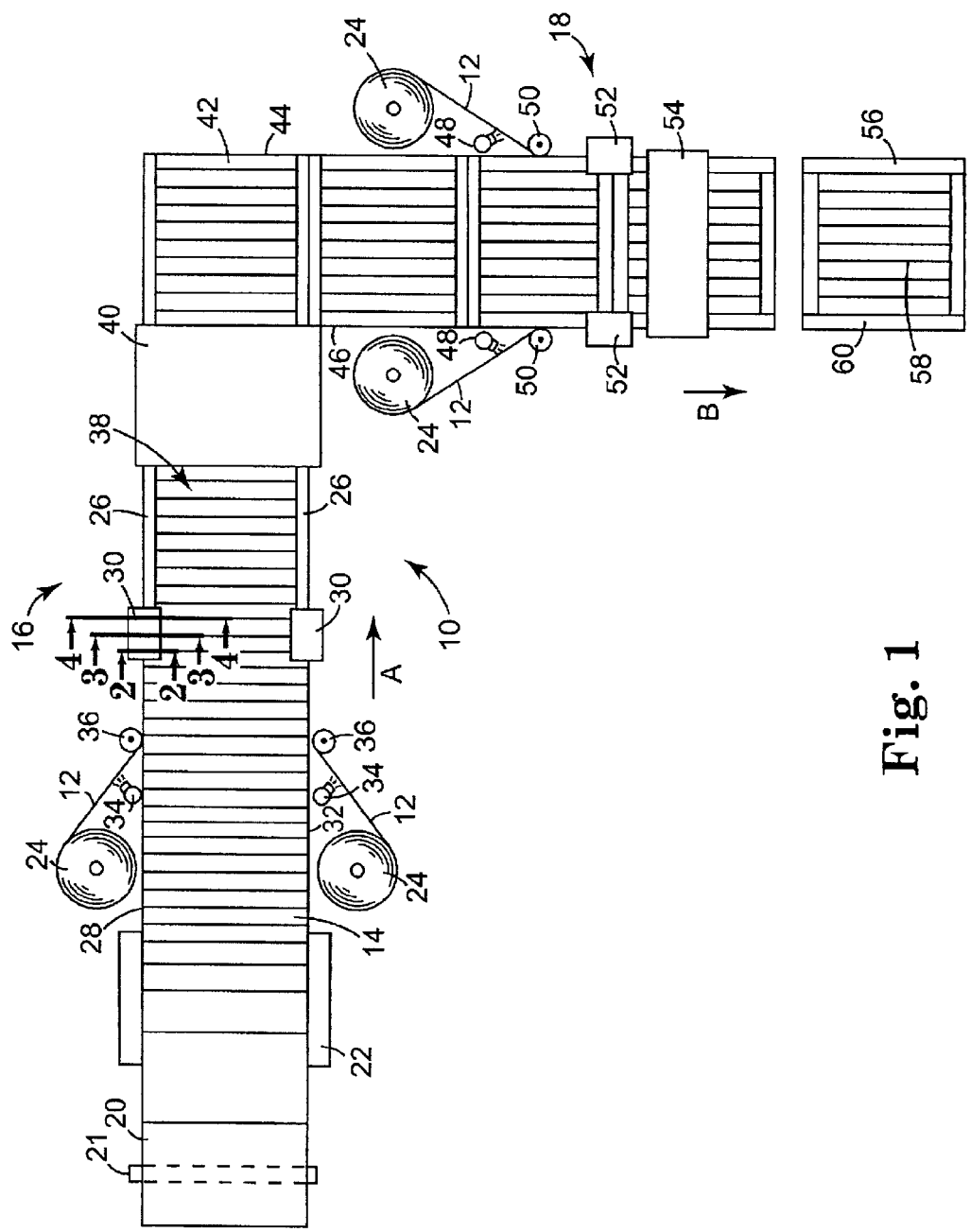
FIG. 1 is a schematic illustration of a system and method for accomplishing the continuous combination of strip framing material and filtration media as an in-line process.

As shown in FIG. 1, the system 10 comprise a first portion 16 for combining strip framing material 12 with the pleated filtration media 14 along two parallel edges and a second portion 18 for combining strip framing material 12 to the remaining two parallel edges of the pleated filtration media 14. Specifically, pleated filtration media 14 is illustrated as made up from filtration media 20 that is supplied as a roll, that itself is operatively supported, such as on a rotational axis 21, that may be driven, braked or freely rotatable, and from which filtration media 20 can be unwound. The pleated filtration media 14, as illustrated in FIG. 1, is converted from the filtration media 20 at a pleating station 22 into the pleated filtration media 14. Such pleating mechanisms are conventional and well-known, and any such mechanism is contemplated to be used with the present invention. Typically, the pleating station 22 includes a device for creating the folds of the supplied material at specific intervals and holding the folded material in place as formed, such as by a screw holding mechanism.

Although FIG. 1 illustrates a system 10 for combining strip framing material 12 to pleated filtration media 14, it is specifically contemplated that any other type of overall generally flat filtration media can be utilized in accordance with the present invention. That is, it is preferable that the filtration media define at least one substantially flat plane at least along one of its edges for connection with the strip framing material 12. In the case of the pleated filtration media 14, the combination of peaks formed by the subsequent folds creates the overall general plane at the edge of the pleated filtration media 14 for connection with the framing material 12. The filtration media 20, whether pleated or utilized in substantially flat state or otherwise, can comprise open cell structures, porous layers, or like, any of which can comprise any known or developed materials, such as porous foams, non-wovens, papers, or the like, alone or in combination with one another.

The strip framing material 12 is preferably provided in rolls 24 that may be operatively rotatably supported on any known or developed device and positioned relative to a moving line of the pleated filtration media 14. The pleated filtration media 14 may be conveyed in any known or developed manner. Preferably, the pleated filtration media 14 moves continuously in its machine direction (in the direction of arrow A in FIG. 1) while strip framing material 12 is unwound from at least one supply roll 24. It is understood that the strip framing material 12 can be driven from the roll 24, either by driving the roll itself or by driving the strip framing material 12 from the roll, or the combination of the strip framing material 12 with the pleated filtration media 14, which itself is driven, can simply unwind the strip framing material 12 from its roll 24. If the strip framing material 12 is provided in a different form than a roll 24, likewise, the strip framing material 12 can be combined and driven in any known or developed way.

In accordance with the present invention, the strip framing material 12 is preferably of a nature such that it may be provided in roll form. To do so, it is preferable that the strip framing material be generally flat so that it may be wound upon itself. Preferred examples and specific embodiments will be discussed below in greater detail. The strip framing material 12 includes at least one edge portion 26 that may be bent to overlie at least an edge portion of the pleated filtration media 14 along either its top or bottom. As illustrated in FIG. 1, at least a first surface of the pleated filtration media 14 is partially covered by the edge portion 26 of the strip framing material 12 after it is brought into engagement with a side edge 28 of the pleated filtration media 14. An edge folding device 30 is schematically illustrated for bending the edge portion 26 over the edge of pleated filtration media 14. Preferably, both first and second edge surfaces of the pleated filtration media 14 are partially covered by edge portions of the strip framing material 12 by being bent in place by the edge folding device 30. Additionally, in order to provide a frame ultimately entirely around the filtration media of a filter product, a parallel side edge 32 is also preferably combined with strip framing material 12 in the same preferable way.

In order to effectively combine the strips of the framing material 12 along the edges of the pleated filtration media 14, an adhesive may be applied, such as by spraying, direct application, or transfer coating, to some or all of the inside surface of each strip of framing material 12 prior to contact with the edges 28 and 32 of the pleated filtration media 14. In one embodiment, adhesive spray nozzles 34 are illustrated that are operatively positioned and supported so as to spray adhesive to the inside surfaces of the strip framing material 12 just prior to contact with the edges 28 and 32 of the pleated filtration media 14. Pressure rollers 36 are also preferably provided for applying the strips of framing material 12 under pressure to the filtration media edges 28 and 32. The pressure rollers 36 may be conventionally supported to apply a desired contact pressure as known. By applying such adhesive to substantially the entire inside surface of each strip of framing material 12, it is possible to effectively seal the filtration media edges 28 and 32 to the framing material 12. Moreover, the adhesive can be utilized for holding the one or more edge portions 26 in their bent orientation. This can be done by way of the bent edge portion 26 adhering to the top or bottom edge surfaces of the pleated filtration media 14 and/or by way of the adhesive itself holding the bent edge portion 26 in place once the adhesive has cured.

Instead of spraying adhesive by nozzles 34 just prior to the combination of the framing material strips 12 with the pleated filtration media 14, the framing material 12 may be supplied with a coating of adhesive that has been pre-applied. Moreover, the tackiness of such adhesive may be rendered inactive to be activated just prior to application. In the case of a pressure sensitive adhesive, a release liner (not shown) may be provided to permit rolling of the strip framing material 12, which liner is removed to activate the adhesive prior to contacting the edges 28 and 32 of the pleated filtration media 14. Alternatively, a hot melt adhesive may be pre-applied to the framing material strips 12, which under normal conditions and temperatures is not tacky, so that the framing material strips 12 can be provided in roll form. Then, prior to contact with the side edges 28 and 32 of the pleated filtration media 14, the hot melt adhesive would be activated by heat (i.e. raising its temperature above its softening point) so as to be tacky for adhering the framing material strips 12 to the pleated filtration media 14. Heat may be supplied by any conventional means (not shown), such as a hot air nozzle, IR source, radiation source, microwave energy, and like.

It is also contemplated that other means may be used besides adhesive for effectively combining the framing material strips 12 to the side edges 28 and 32 of the pleated filtration media 14. Depending on the materials used, and the similarities of characteristics required, welding techniques may be utilized. For example, ultrasonic welding or any other thermal welding process may be used where similar polymeric materials are utilized for the pleated filtration media 14 and the framing material strips 12. Even if the materials do not permit welding of the framing material strips 12 to the pleated filtration media 14, such a welding or bonding process can be utilized for locking the bent edge portion 26 in place regardless of what other technique is utilized for combining the pleated filtration media 14 with the framing material strips 12. Other retention means, such as mechanical clips and fasteners may also be used alone or in combination with any of the above techniques depending on the quality of the filter to be obtained and the specific application thereof, which retention means may be utilized for either or both of the techniques to connect framing material strips 12 to the pleated filtration media 14 and/or for locking the bent edge portion 26 in position.

Sequentially after the pleated filtration media 14 is combined with continuous strips of framing material 12 on its parallel edges 28 and 32, and after the edge portions 26 are bent in place by the edge folding devices 30, an intermediate filter product 38 is made having significant structural integrity. Where the pleated filtration media 14 is a pleated material, the pleats are now maintained in place due to the combination of the structural framing material strips 12.

The intermediate filter product 38 preferably continues to run in the machine direction A shown in FIG. 1 to a cutting station 40. The cutting station 40 can comprise any known or developed mechanism for severing the intermediate product 38 (i.e. the pleated filtration media 14 with one or more side edges comprising the strip of framing material 12) and thereafter defining a series of individual partially completed filter products 42 having filtration media side edges 44 and 46. The cutting station 40 itself may include a rotary blade, guillotine type blade, hot wire cutter, laser cutter, or other known or developed cutting device (none of which are shown) that may operate while the intermediate filter product 38 continues to move or during intermittent stops in the continuous manufacturing process.

At this point, the first portion 16 of the system 10 is complete and the second portion 18 begins. That is, it is preferable that the filtration media side edges 44 and 46 are also combined with strip framing material 12. System portion 18 is preferably substantially similar to the system portion 16. Starting with the series of partial filter products 42, additional rolls 24 of the strip framing material 12 are operatively positioned and supported along a direction of conveyance of the partial filter products 42. The manner of conveyance may be any conventional or developed technique whereby the partial filter products 42 may be conveyed one after another either spaced from one another or in contact with one another. As illustrated in FIG. 1, the direction of conveyance is shown as arrow B, which direction is substantially perpendicular to the machine direction A. This permits the further combination with the additional framing material strips 12 without having to reorient the partial filter products 42. Conveyance direction B defines the in-line direction of the system portion 18. However, instead, the in-line direction of the system portion 18 can be any direction including the same as machine direction A of system portion 16 provided that the partial filter products 42 are reoriented as necessary for applying framing material strips 12 to the filtration media side edges 44 and 46. Where the partial filter products 42 are other different shapes, the same principles apply taking into account the surface or surfaces to which additional strip framing material 12 is to be applied.

System portion 18 comprises the rolls 24 of the framing material strips 12, adhesive spray nozzles 48, pressure rollers 50, edge folding devices 52 and a cutting station 54. All of the alternatives described above and suggested or contemplated in regard to the system portion 16 are equally applicable within the system portion 18 as to any of these elements and alternatives thereto. In this case, however, the cutting station 54 needs only to sever the one or more framing material strips 12 as they are applied to the filtration media side edges 44 and 46. The pleated filtration media 14 is already separated into the distinct media portions that make up the partial filter products 42.

Preferably, and as illustrated at the end of system portion 18, any number of filter products 56 are made. As shown, each filter products 56 comprises a filtration media portion 58 that is preferably completely surrounded by a frame 60. In the case of a rectangular filtration media portion 58, four pieces of the frame 60 are made from pieces of the strip framing material 12 as applied from four different supply rolls 24. Where it is desirable depending on specific applications, the frame 60 may only partially surround the filtration media portion 58. The same is true for other shapes that may include curved edge surfaces and combinations of linear and curved edge service portions.

Figure 12:
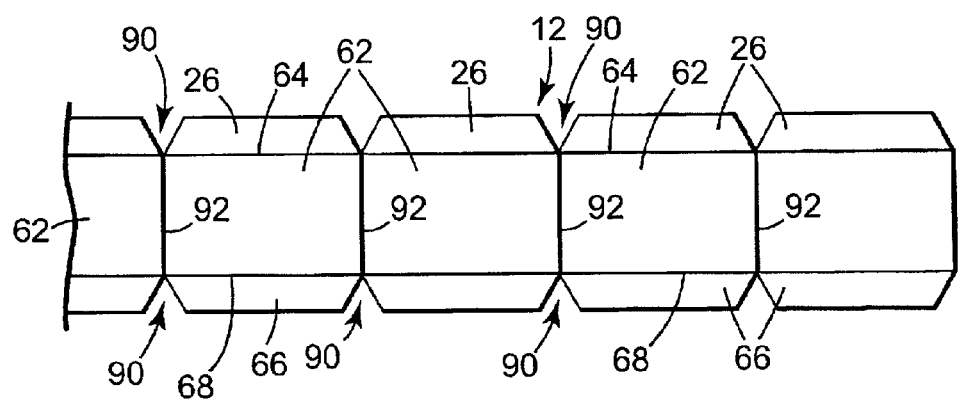
FIG. 12 is a side view of a framing material in accordance with the present invention having features to enhance folding of framing material about corners of shaped filtration media.

It is also contemplated that the continuous strip framing material 12 may be applied sequentially to more than one edge surface of a shaped filtration media without having to reorient the filtration media. For example, by utilizing a sufficiently flexible material for the continuous strip framing material 12, the continuous strip framing material 12 can be wrapped about one or more corners sequentially. As another example, the continuous strip framing material 12 may be provided with spaced notches 90 at desired corner locations to facilitate folding about corners of the filtration media, as illustrated in FIG. 12. Such notches 90 may be provided along one or both longitudinal edges of the strip framing material 12. Preferably, matched notches 90 for a corner are also connected by fold enhancing lines 92, which may comprise any type of living hinge or line of weakening as known or developed to facilitate folding along such line. Any cutting, notching, scoring, and the like may be conducted on the indefinite length of continuous strip material 12, as supplied as either part of the in-line filter framing process or anytime previous thereto, or during manufacture thereof. Moreover, mechanisms have been developed for material, such as adhesive tape, to be applied about a corner of an object. For example, for sealing boxes with tape, many different taping heads have been developed for applying and cutting tape as supplied from a roll over one or more box corners. Such devices are known for applying a C-clip of tape or an L-clip of tape depending on whether the tape is applied over one or two box corners. It is contemplated that similar mechanisms could be used for applying the continuous strip framing material over one or more filter media edge surfaces, if exposed, with corners in between. Curved edge surfaces may be similarly combined with strip framing material.

Figure 7:
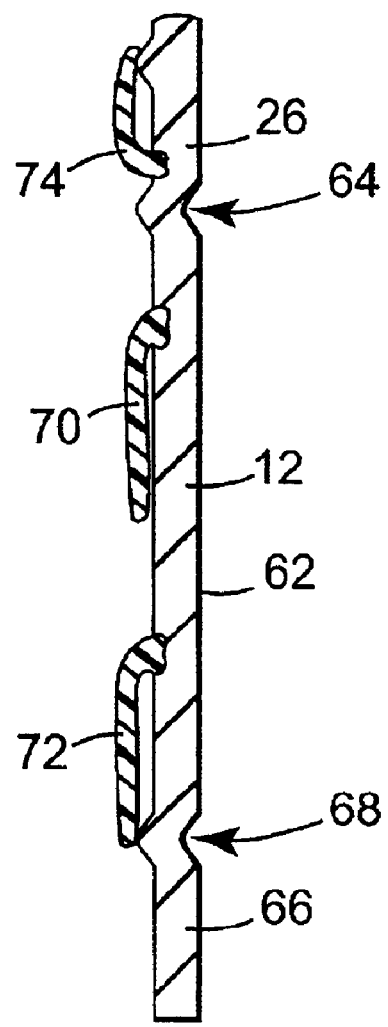
FIG. 7 is a cross-sectional view through the framing material in a substantially flat state, such as may be provided as a layer of a roll of such framing material.

With reference to FIG. 7, a cross-section of one embodiment of a strip framing material 12 is illustrated for use in accordance with the present invention. Specifically, the strip framing material 12, as shown, is capable of obtaining a substantially flat profile so that it can be wound up, for example, in roll form. The framing material 12 comprises a sidewall portion 62, a first edge portion 26 that is connected to the sidewall portion 62 by a living hinge 64. A second edge portion 66 is also preferably connected with the sidewall portion 62 at its opposite parallel edge by a second living hinge 68. The living hinges 64 and 68 permit the edge portions 26 and 66 to be bent along their direction of extension. Living hinges themselves are well-known and particularly applicable to certain polymeric materials having a desired level of flexibility so that the end portions 26 and 66 may be bent from the sidewall portion 62 without breaking. Such living hinges may include grooves or score lines that define them and/or elongated protrusions from the oppositely facing sides for effectively controlling where the bend may occur. Alternatively, lines of weakening may be defined providing the fold lines, such as by perforations, partial cuts, thinned areas, zones of elastomeric polymers or resilient materials, and the like, as are conventionally known.

Also shown in FIG. 7, the strip framing material 12 preferably includes other sealing features so that the resultant frame comprising the strip framing material 12 can be effectively sealed in place for its specific application. Specifically, one or both of upper and lower side seals 70 and 72, respectively, are preferably also provided to extend entirely along the sidewall portion 62 of the strip framing material 12 so that the resultant frame will include such upper and/or lower side seals 70 and 72, respectively, around its complete perimeter. In a similar sense, a face seal 74 preferably extends along the edge portion 26 to create a perimetric face seal for the resultant frame. The sealing features 70, 72 and 74 are preferably more flexible than the material comprising the sidewall portion 62 and the edge portions 26 and 66. As shown in FIG. 7, these sealing features 70, 72 and 74 are flattened against the sidewall portion 62 and edge portions 26 and 66 so that the strip framing material 12 is substantially flat for winding as a roll. It is understood that these features would preferably not assume the illustrated flattened configuration without a force acting to do so. That is, FIG. 7 illustrates sealing features 70, 72 and 74 each under a force to flatten them from their respective functional memory states. The illustration shows the strip framing material 12 as it would look as a layer within a roll thereof where subsequent layers provide such force.

Is also contemplated that the sealing features 70, 72 and 74 may comprise different material than the sidewall portion 62 and edge portions 26 and 66. Such can be accomplished by a co-extrusion process, such as described in the commonly owned PCT International Application publication number WO 01/02080A1, published Jan. 11, 2001, the entire disclosure of which is hereby incorporated by reference. Likewise, it is contemplated that the sidewall portion 62 and edge portions 26 and 66 may themselves be formed of different materials from one another or within each.

Figure 2:
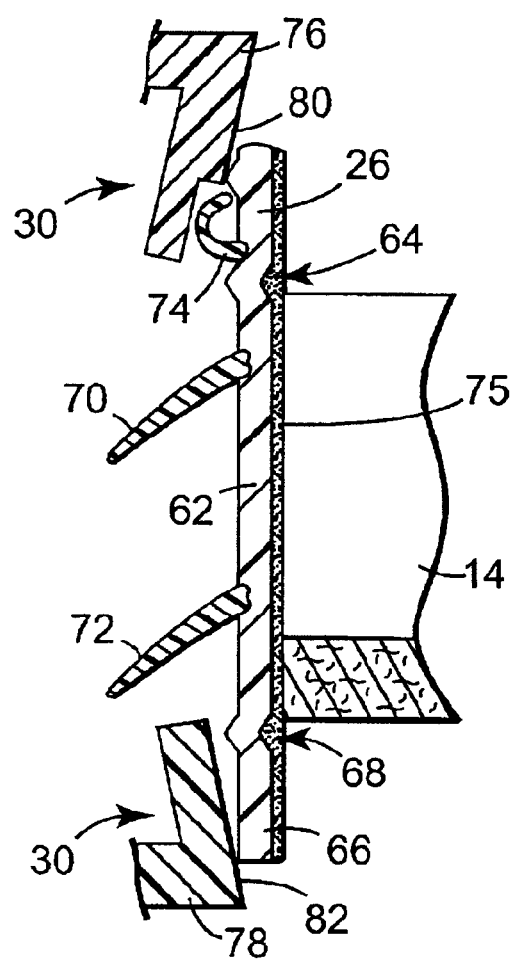
FIG. 2 is a cross-sectional view taken along line 2—2 of FIG. 1 showing the framing material adhered against an edge of the filtration media with the framing material in a substantially flat orientation and positioned against an edge folding cam surface of an edge folding device.
Figure 3:
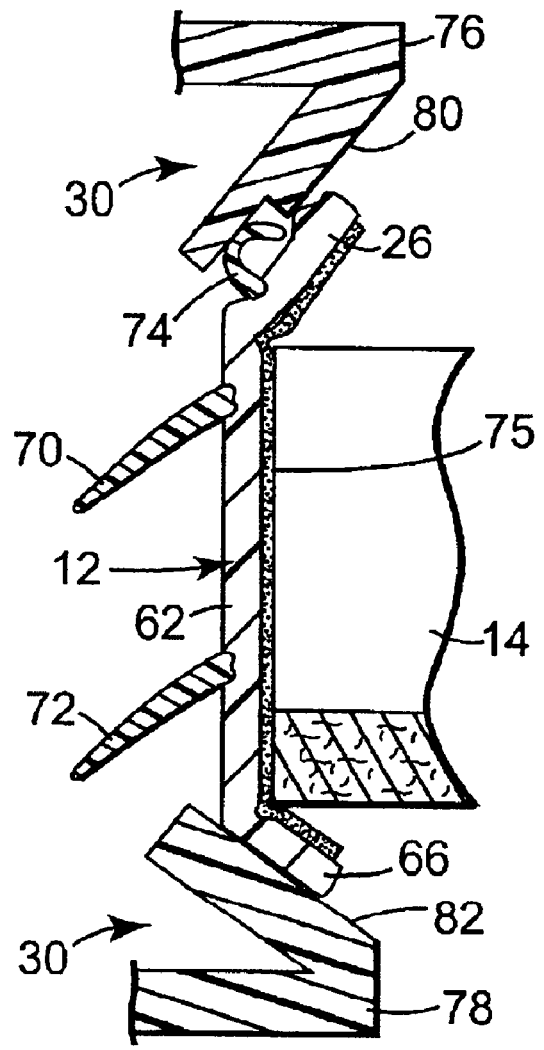
FIG. 3 is a cross-sectional view taken along line 3—3 of FIG. 1 showing the framing material adhered against an edge of the filtration media with the framing material edge portions partially bent toward the filtration media by the edge folding cam surface of the edge folding device.
Figure 4:
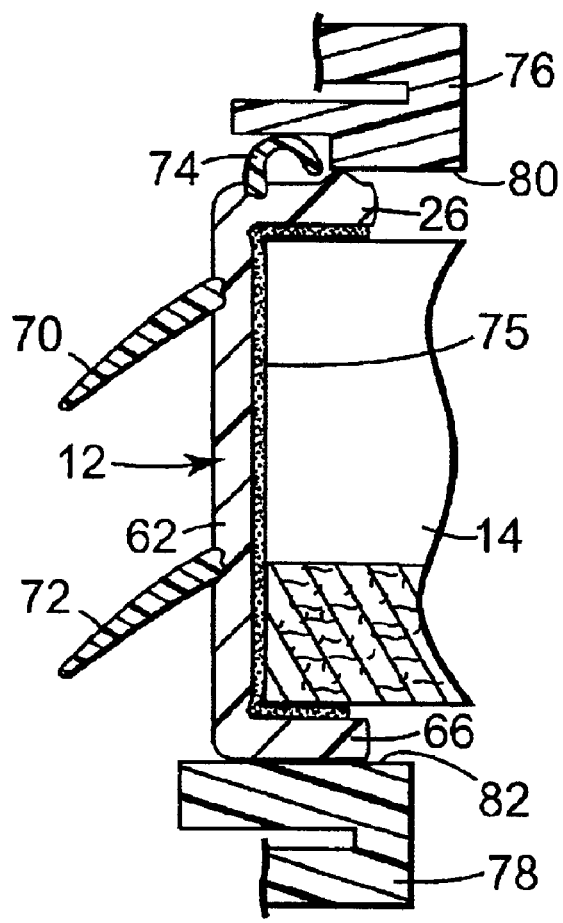
FIG. 4 is a cross-sectional view taken along line 4—4 of FIG. 1 showing the framing material adhered against an edge of the filtration media with the framing material edge portions fully bent against top and bottom surfaces of the filtration media by the edge folding cam surface of the edge folding device.

FIGS. 2, 3 and 4 show the strip framing material 12 as illustrated in FIG. 7 but with the upper and lower side seals 70 and 72, respectively, and the face seal 74 in their normal functional state, preferably defined by the memory state of resilient materials, and with the edge portions 26 and 66 sequentially folded along living hinge fold lines 64 and 68, respectively. The illustrated pleated filtration media 14 comprises a pleated filtration media that is adhered to the sidewall portion 62 of the strip framing material 12 by a layer of adhesive 75. The adhesive layer 75 further extends to substantially preferably cover the inside surfaces of the upper and lower edge portions 26 and 66 of the strip framing material 12.

An edge folding device 30 is also illustrated comprising an upper portion 76 and a lower portion 78. The upper portion 76 defines an upper edge folding cam surface 80 and the lower portion 78 defines a lower edge folding cam surface 82. As it is seen in the combination of FIGS. 2, 3 and 4, the upper and lower edge folding cam surfaces 80 and 82 bend the upper and lower edge portions 26 and 66 of the strip framing material 12 from a vertical state (i.e. in line with sidewall 62) to a substantially perpendicular state extending toward the pleated filtration media 14. As above, it is contemplated to only provided one of the edge portions 26 and 66, if desired, in which case the edge folding device 30 may comprise only an upper or lower portion 76 or 78.

As illustrated in FIG. 2, the upper and lower edge folding cam surfaces 80 and 82 may start at the leading edge of the edge folding device 30 vertical or substantially vertical so that the edge portions 26 and 66 can feed into the edge folding device 30 without substantial restriction. As suggested by FIG. 3, the upper and lower edge folding cam surfaces 80 and 82 are gradually lowered from vertical toward the top and bottom planes of the filtration media surface edges, which edge folding cam surfaces 80 and 82 cause the gradual bending of the upper and lower edge portions 26 and 66 of the strip framing material 12. As shown in FIG. 4, the upper and lower edge folding cam surfaces 80 and 82 preferably gradually become substantially horizontal (i.e. parallel to the upper and lower edge surface planes of the pleated filtration media 14). This results in the edge portions 26 and 66 of the strip framing material 12 becoming completely folded to lie against the edge surfaces (formed by the pleated points) of the pleated filtration media 14.

The edge folding cam surfaces 80 and 82 may each comprise a single curved surface for causing the gradual folding of the edge portions 26 and 66 of the strip framing material 12. Alternatively, a number of distinct cam surfaces may be provided in series to cause the gradual folding. Any number of other edge folding techniques that are known or developed are contemplated that may be used instead of or in combination with the use of cam surfaces. As examples, one or more rollers may be utilized that may be fixed in series or mobile to accomplish the same feat. Likewise, other moving or reciprocating mechanisms are known and contemplated.

It is preferable that the edge folding devices 30 provide pressure to the one or more edge portions 26 and 66 for a sufficient enough time when adhesive 75 is used so as to permit the adhesive 75 time to set sufficiently so that the edge portions 26 and 66 will not spring back. In the case of hot melt adhesive, sufficient time is needed for the adhesive to cool and set, which time can be accelerated by the introduction of a cooling mechanism. Other adhesives may require the introduction of the other treatments to cure the adhesive, e.g. UV treatment, and like.

Also, depending on the performance characteristics needed for the filter products to be made, more or less adhesive may be coated by weight onto the inside surfaces of the strip framing material 12. Typically, heavier coating weights are utilized where higher filtration standards are needed so as to very effectively seal the pleated filtration media 14 to the sidewall portion 62 of the strip framing material 12. Also, depending on the type of filtration media 20, more or less adhesive may be desirable. With a pleated filtration media 14, care must be taken so that all of the length of edges of the pleats are adhered effectively to the sidewall portion 62 for high-performance filtration standards. Thinner and/or continuous edge filtration media may require adhesive over only a portion of the sidewall portion 62 to provide an effectively sealed edge.

Figure 6:
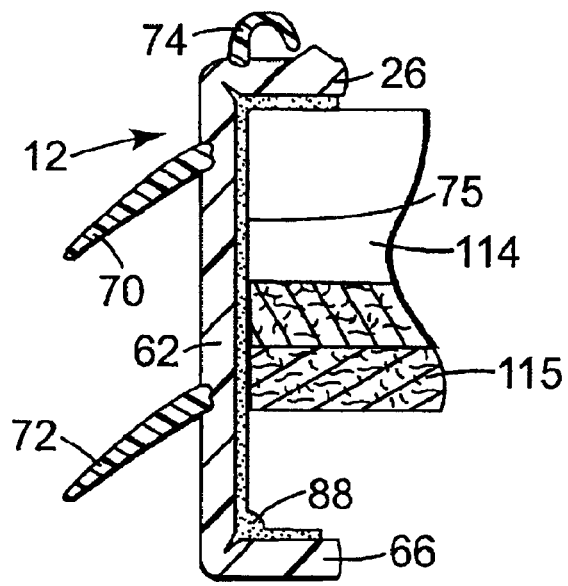
FIG. 6 is a cross-sectional view similar to FIG. 4 but showing a thinner filtration media combined with the framing material.

For example, as shown in FIG. 6, a thinner filtration media 114 may comprise a pleated filtration media but that extends only partially along the sidewall portion 62 of the strip framing material 12. The filtration media 114 is illustrated with a top edge surface thereof positioned against and adhered to the upper edge portion 26 of the strip framing material 12 by adhesive layer 75. The bottom edge surface of the filtration media 114 is spaced from the lower edge portion 66 of the strip framing material 12. Adhesive layer 75, however, does still provide a means by which the lower edge portion 66 is fixed in orientation relative to the sidewall portion 62 after it is bent in place. The bending technique would still be the same. In this illustrated configuration, the filtration media 114 is combined with a second layer of filtration media 115, which may comprise similar or dissimilar media, and that, as positioned, can function as a pre-filter. Such a stacked construction, whether in a configuration shown in FIG. 6, or making up a configuration such as shown in FIGS. 2, 3 and 4, or otherwise, may comprise more than two layers of different or same filtration materials, which layers may be positioned adjacent to or spaced from one another depending upon a desired application. Some or all of the layers may be sealingly supported by the sidewall portion 66 and/or either of the edge portions 26 and 66.

Figure 5:
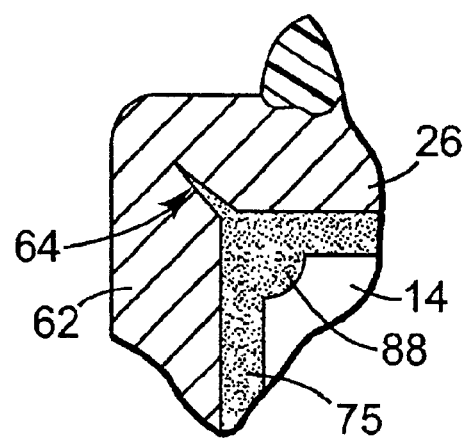
FIG. 5 is an enlarged cross-sectional view of the top corner of the framing material and the filtration media showing an adhesive bead formed at the inner corner by the framing material.

FIG. 5 shows the upper corner connecting edge portion 26 to the upper edge of sidewall portion 62 of the strip framing material 12. The living hinge 64 preferably comprises a score line or groove that may be formed or cut into the thickness of the material comprising the strip framing material 12, which score line or groove becomes closed as the edge portion 26 is bent substantially perpendicular to the sidewall portion 62 of the strip framing material 12. The result of this action is the squeezing out of the quantity of adhesive that was within the score line or groove. This advantageously forms a thicker bead 88 of adhesive at the inside corner between sidewall portion 62 and bent edge portion 26. This bead 88 of adhesive has been found to enhance the sealing of the pleated filtration media 14 to the strip framing material 12.

A manner of making yet another different strip framing material 112 is illustrated in FIGS. 8 through 11. This technique is similar to those described above with respect to the strip framing material 12, but it is specifically designed where thinner, less rigid material is used to make up the strip framing material 112. As opposed to the relatively thicker and more rigid preferred polymeric materials discussed above, thin sheet material, such as paperboard, chipboard, and like, can be sequentially folded to not only define the structural configuration required (i.e. sidewall and surface edge covering portions of the frame), but also to provide the structural integrity sought. Such structural integrity can be even further enhanced by folding the thin sheet material in order to create structurally strong members, like box beams, I-beams, and the like.

Figure 8:
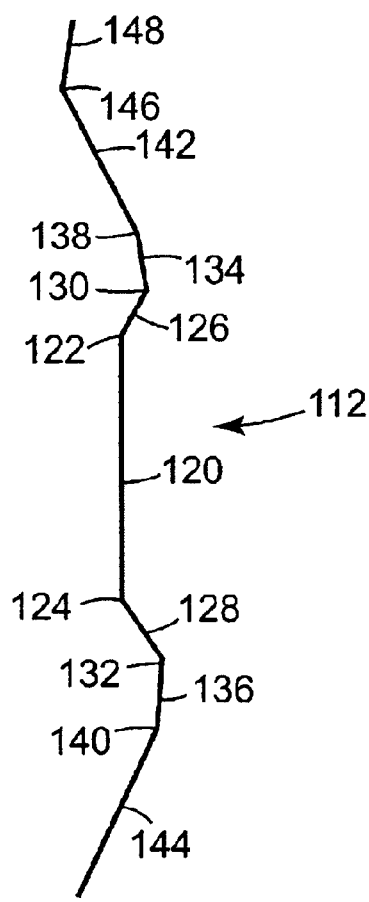
FIG. 8 is an edge view of a portion of framing material with the score lines provided in the machine direction of the framing material to define fold lines by which the framing material may be folded into a substantially rigid frame construction.

As shown in FIG. 8, a paperboard material can be provided that may conventionally be supplied in roll form. Subsequent to unwinding from such a roll, the strip framing material 112 may be scored or perforated or otherwise provided with lines of weakening so as to define a number of fold lines that separate any number of structural components. Preferably, the fold lines define a first sidewall portion 120 bounded by fold lines 122 and 124. First upper and lower edge portions 126 and 128 are connected, respectively, by the fold lines 122 and 124 to the first sidewall portion 120, and are further connected by fold lines 130 and 132 to second upper and lower edge portions 134 and 136. The second upper and lower edge portions 134 and 136 are connected, respectively, by fold lines 138 and 140 to second sidewall portions 142 and 144. The second upper and lower edge portions 134 and 136 are also preferably slightly longer than the first upper and lower edge portions 126 and 128, respectively, in order to cooperate together to create corner interlocks with second sidewall portions 142 and 144, respectively. By also providing adhesive, for example, at these corner interlocks, the strip framing material 112 can be very effectively locked in a use configuration, discussed more below.

Where it is desired to create a rectangular box-beam structure out of the first and second sidewall portions 120, 142 and 144, the second upper and lower edge portions 134 and 136 may be extended further from fold lines 130 and 132 so that the second sidewall portions 142 and 144 will be spaced from the first sidewall portion 120 when the assembly is complete. To create a triangular box structure that is open within the sidewall structure, one of either the upper and lower edge portions 134 and 136 could be made longer than the other. Structures having internally created boxes of various shapes are contemplated as such structures are capable of being created by including any number of fold lines and sidewall portions that when assembled create one or more open box structures. As a further example, a plurality of box structures could be provided between the first sidewall portion 120 and the second sidewall portions 142 and 144 (as viewed from top to bottom in FIGS. 8 and 9) by adding fold lines and pairs of additional small wall portions that lie together to create webs portions of the overall structure that are connected between the first and second sidewalls. Each web portion could create similar or different open box structures in a column. Likewise, side-by-side box structures could be defined.

Also according to the illustrated embodiment, yet another fold line 146 can be provided at the farthest extent of the upper second sidewall portion 142 to create a connection to a seal-making portion 148. As is apparent, a structure is possible including the first and second sidewall portions 120, 142 and 144 layered, laminated together, or spaced from one another and wherein the first and second upper and lower edge portions 126 and 134, 128 and 136, respectively, are layered, laminated together or spaced from one another. Such constructions are possible from a single layer of thin material that may easily be supplied in roll form and entirely converted, including the provision of fold lines by scoring, perforated, etc., as part of an in-line process.

Figure 9:
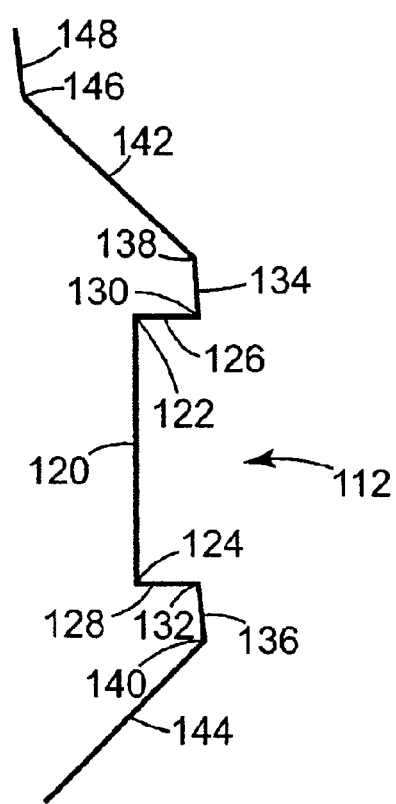
FIG. 9 is an edge view similar to FIG. 8 but showing they framing material further folded from its FIG. 8 configuration including a channel structure.
Figure 10:
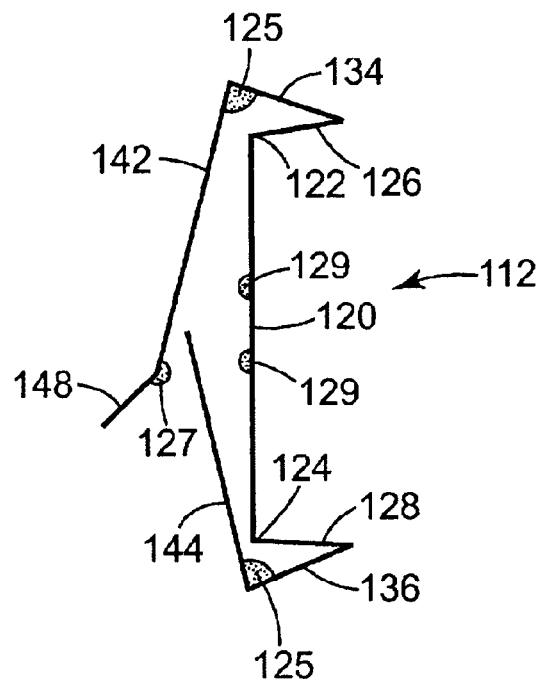
FIG. 10 is an edge view similar to FIGS. 8 and 9 showing the framing material further folded with an additional material layer provided against the back surface of the channel structure for increasing rigidity thereof.
Figure 11:
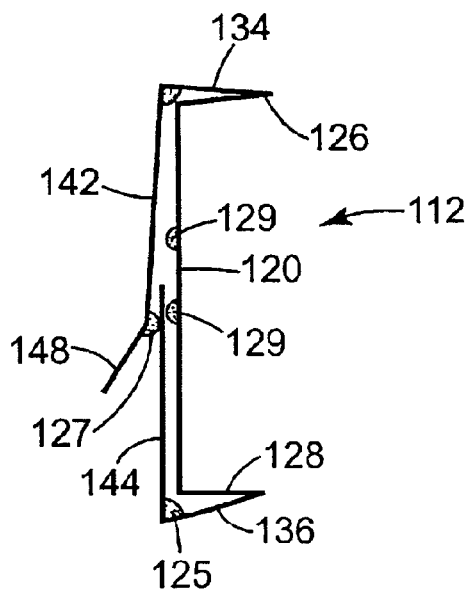
FIG. 11 is an edge view similar to FIGS. 8 through 10 showing the framing material completely folded to provide a rigid channel structure comprising laminate layers and a perimetric seal.

FIG. 9 illustrates the strip framing material 112 partially folded whereby the first sidewall portion 120 and the first upper and lower edge portions 126 and 128, respectively, define a channel shape sized to accommodate whatever filtration media is to be combined according to a process of the present invention, such as discussed above. In FIG. 10, further folding along the fold lines 130, 132, 138 and 140 position the second upper and lower edge portions 134 and 136, respectively, toward the first upper and lower edge portions 126 and 128, respectively, and the second sidewall portions 142 and 144 toward the first sidewall portion 120. FIG. 11 illustrates the completely folded structure with the combination of first and second sidewall and edge portions defining a single channel structure of laminate construction comprising two layers throughout. The seal making portion 148 is illustrated bent away from the back surface of the strip framing material 112 to act as a seal similar to the seals 70 and 72 of the earlier embodiment.

Preferably, adhesive is supplied over some or all of the back surface of the strip framing material 112 before folding so that when the folding is completed, a secure laminate and/or spaced structure is created. It is understood that adhesive may be applied in patterns, beads, or just at certain edges such as to interlock just the corners or otherwise to hold the configuration as desired. It is also contemplated that adhesive can be applied in a way to facilitate the creation and support of beam box structures, as described above. For example, beads or discrete deposits of hot melt adhesive, such as adhesive beads 129 shown in FIG. 10 can be utilized as support and spacing components provided between sidewall portions, which support and spacing can even further strengthen the sidewall beam construction. Such adhesive deposits or beads 129 can be provided of any thickness (based upon its ability to be applied) in order to facilitate appropriate spacing of such box beam structure. Adhesives can comprise any kind whether applied tacky or rendered tacky including hot melt adhesives, pressure sensitive adhesives and the like. Adhesives may be applied as a thin coating, layer, bead, or the like. For example, as shown in FIG. 10, adhesive beads 125 may be provided as desired (the size of which is exaggerated for illustration) at any location to lock the structure in a desired configuration. Furthermore, an adhesive bead 127, for example, can be provided so as to hold the seal marking portion 148 in an outward position. Moreover, it is contemplated that other structures can be created in a similar manner. That is, additional features may be provided, less features may be provided, additional layers or partial layers may be created or an altogether different channel structure may be provided utilizing this concept. As further examples, the folding configuration can create enclosed or partially enclosed spaces similar to box beams, I-beams, etc. Moreover, any quality of paperboard, for example, can be utilized, where the grade of such paperboard may also affect the application of adhesive, such as its placement and quantity.

A process, such as illustrated in FIGS. 8 through 11, can be utilized in accordance with the filter making methods of the present invention wherein the strip framing material 112 can be combined with filtration media in much the same manner as strip framing material 12 described above. That is, the conversion steps for creating a desired strip frame structure may be completely conducted in line and prior to bringing the strip framing material 112 into contact with an edge of the filtration media. Like the methods discussed above, adhesive techniques and other connecting techniques and means may be utilized to combine the strip framing material 112 with filtration media. The benefit of this latter technique is that a sufficient strip framing material can be created from cheap materials, such as paperboard or chipboard, which materials can be provided in large roll forms and which process can be conducted in line in accordance with the present invention for creating framed filter products.

What is claimed is:

1. A method of making filtration product comprising the steps of:
   providing filtration media having a first face, a second face and at least one side edge surface;
   providing an indefinite length supply of strip framing material, said strip framing material including at least one longitudinally extending sidewall portion and an edge portion separated by a longitudinally extending living hinge;
   providing substantially the entire sidewall and edge portion including the living hinge with an adhesive layer;
   combining a length of the strip framing material along at least a portion of the side edge surface of the filtration media so as to adhere the adhesive on the sidewall portion of the strip framing material along an edge of the filtration media;
   bending the edge portion of the strip framing material that has been combined with the filtration media from a first orientation, wherein the edge portion extends generally in a transverse direction of the sidewall portion of the strip framing material, to a second orientation, wherein the edge portion extends more toward the filtration media than in the first orientation thereof so as to squeeze adhesive from the living hinge to form a bead of adhesive between the sidewall portion and the edge portion;
   securing the edge portion of the strip framing material in its second orientation; and
   cutting the strip framing material as combined with the filtration media from its supply of indefinite length.

2. The method of claim 1, wherein the strip framing material is combined with the filtration media while moving the filtration media in a machine direction.

3. The method of claim 2, wherein the bending step is conducted while the filtration media and the combined strip framing material are moved together in the machine direction.

4. The method of claim 3, wherein the filtration media is also supplied from an indefinite length supply of the filtration media.

5. The method of claim 4, further including the step of cutting the filtration media after the filtration media is combined with the strip framing material.

6. The method of claim 5, wherein the filtration media is cut during the cutting step of the strip framing material.

7. The method of claim 3, wherein the bending step reorients the edge portion to the second orientation with the edge portion positioned substantially perpendicular to the sidewall portion of the strip framing material and a portion of the adhesive remains in the living hinge.

8. The method of claim 7, wherein the strip framing material is supplied as an indefinite length and the bending step reorients the edge portion along the living hinge.

9. The method of claim 7, wherein the strip framing material is supplied as an indefinite length with the longitudinally extending sidewall portion and two reorientable edge portions, and the bending step includes bending both edge portions relative to the sidewall portion from first orientations, wherein the edge portions extend generally in a transverse direction of the sidewall portion of the strip framing material, to second orientations, wherein the edge portions extend substantially perpendicular from the sidewall portion and toward the filtration media.

10. The method of claim 9, wherein each of the edge portions are connected with the sidewall portion by a longitudinally extending living hinge and the bending step reorients the edge portions along the living hinges.

11. The method of claim 9 wherein the living hinge is formed by a score line or groove.

12. The method of claim 11, further including the step of activating the adhesive on the strip framing material prior to combining the strip framing material along an edge of the filtration media, but after the strip framing material is provided with inactive adhesive thereon from a supply form thereof.

13. The method of claim 11, wherein the edge portions are secured in their second orientations by the adhesive.

14. The method of claim 11, wherein the filtration media has a thickness substantially the same as a distance between edge portions.

15. The method of claim 11, wherein the filtration media is in engagement with one of the edge portions of the strip framing material and has a thickness less than a distance between edge portions.

16. The method of claim 3, further including providing a second indefinite length supply of strip framing material, combining a length of the second indefinite length supply of strip framing material along at least a portion of a second side edge surface of the filtration media, bending an edge portion of the second strip framing material after combination with the filtration media to an orientation extending more toward the filtration media, securing the edge portion of the second strip framing material in position as bent, and cutting the second strip framing material from its supply of indefinite length.

17. The method of claim 16, wherein the strip framing material lengths are combined to the filtration media along oppositely facing side edge surfaces of the filtration media, and the combining, bending and cutting steps are performed at both side edge surfaces at substantially the same processing times.

18. The method of claim 17, including, after the combining, bending and cutting steps are performed at both oppositely facing side edge surfaces, the further steps of providing at least a third indefinite length supply of strip framing material, combining a length of the third indefinite length supply of strip framing material along at least a portion of a third side edge surface of the filtration media, bending an edge portion of the third strip framing material after combination with the filtration media to an orientation extending more toward the filtration media, securing the edge portion of the third strip framing material in position as bent, and cutting the third strip framing material from its supply of indefinite length.

19. The method of claim 18, further including the step of conveying intermediate filtration products after the combining, bending and cutting steps are performed at both oppositely facing side edge surfaces in a direction different than the machine direction of the filtration media, during which conveyance, the third strip framing material is combined with the filtration media.

20. The method of claim 18, further including the step of reorienting intermediate filtration products after the combining, bending and cutting steps are performed at both oppositely facing side edge surfaces followed by conveying the intermediate filtration products, during which conveyance, the third strip framing material is combined with the filtration media.

21. The method of claim 1, wherein the step of providing an indefinite length supply of strip framing material further comprises providing a roll of the strip framing material.

22. The method of claim 21, wherein the roll of strip framing material comprises multiple windings of the strip framing material having its sidewall portion and edge portion defined and configured so that each winding layer is substantially flat.

23. A method of making filtration product comprising the steps of:

providing filtration media having a fluid inlet face, a fluid outlet face and at least one side edge surface;

providing a supply form of strip material and forming at least one fold line extending longitudinally of the strip material for making an indefinite length of strip framing material divided longitudinally into at least a sidewall portion and two edge portions said strip material being formed by folding the strip material along fold lines to provide the two edge portions and the sidewall portion with at least one of the edge and sidewall portions having multiple layers;

combining a length of the strip framing material along at least a portion of the side edge surface of the filtration media; and bending the edge portion of the strip framing material that has been combined with the filtration media from a first orientation, wherein the edge portion extends generally in a transverse direction of the sidewall portion of the strip framing material, to a second orientation, wherein the edge portion extends more toward the filtration media than in the first orientation thereof.

24. The method of claim 23, further including the steps of securing the edge portion of the strip framing material in its second orientation; and cutting the strip framing material as combined with the filtration media from its supply of indefinite length.

\* \* \* \* \*